United States Patent [19]
Kleinemenke

[11] Patent Number: 6,073,701
[45] Date of Patent: Jun. 13, 2000

[54] TOPPING AND DIGGING DEVICE FOR ROOT VEGETABLE HARVESTING MACHINES

[75] Inventor: Heinrich Kleinemenke, Harsewinkel, Germany

[73] Assignee: Claas Selbstfahrende Erntemaschinen GmbH, Harsewinkel, Germany

[21] Appl. No.: 09/144,867

[22] Filed: Sep. 1, 1998

[30] Foreign Application Priority Data

Sep. 1, 1997 [DE] Germany ............................ 197 38 170

[51] Int. Cl.⁷ .................................................. A01D 27/00
[52] U.S. Cl. ................................ 171/31; 171/45; 171/46; 56/121.44
[58] Field of Search ................................ 171/29, 26, 45, 171/46, 47, 31, 37; 56/121.4, 121.44, 121.45, 121.46

[56] References Cited

U.S. PATENT DOCUMENTS

| | | | |
|---|---|---|---|
| 1,309,940 | 7/1919 | Hannum | 171/29 |
| 1,977,523 | 10/1934 | Morkovski | 171/46 |
| 2,300,063 | 10/1942 | Romine | 171/29 |
| 2,453,714 | 11/1948 | Lapointe | 171/46 |
| 2,455,264 | 11/1948 | Noffsinger | 171/46 |
| 4,185,696 | 1/1980 | Williams et al. | 171/47 X |
| 4,753,296 | 6/1988 | Kruithoff | 171/26 |
| 4,798,248 | 1/1989 | Schwitters | 171/1 |

FOREIGN PATENT DOCUMENTS

| | | | |
|---|---|---|---|
| 01 02 016 A1 | 3/1984 | European Pat. Off. | A01D 27/04 |
| 01 58 763 A1 | 10/1985 | European Pat. Off. | A01D 25/04 |

Primary Examiner—Victor Batson
Attorney, Agent, or Firm—Husch & Eppenberger, LLC; Robert E. Muir

[57] ABSTRACT

A root vegetable harvesting machine has a root vegetable topping and digging unit attached at the front. The root vegetable topping and digging unit is divided into at least two root vegetable topping and digging elements which can be carried by a main frame or individual frames in order to achieve greater working widths for root vegetable harvesting machines. The root vegetable topping and digging elements are mounted so as to be movable independently of one another. The root vegetable topping and digging unit design allows for harvesting more than six rows of root vegetable.

17 Claims, 5 Drawing Sheets

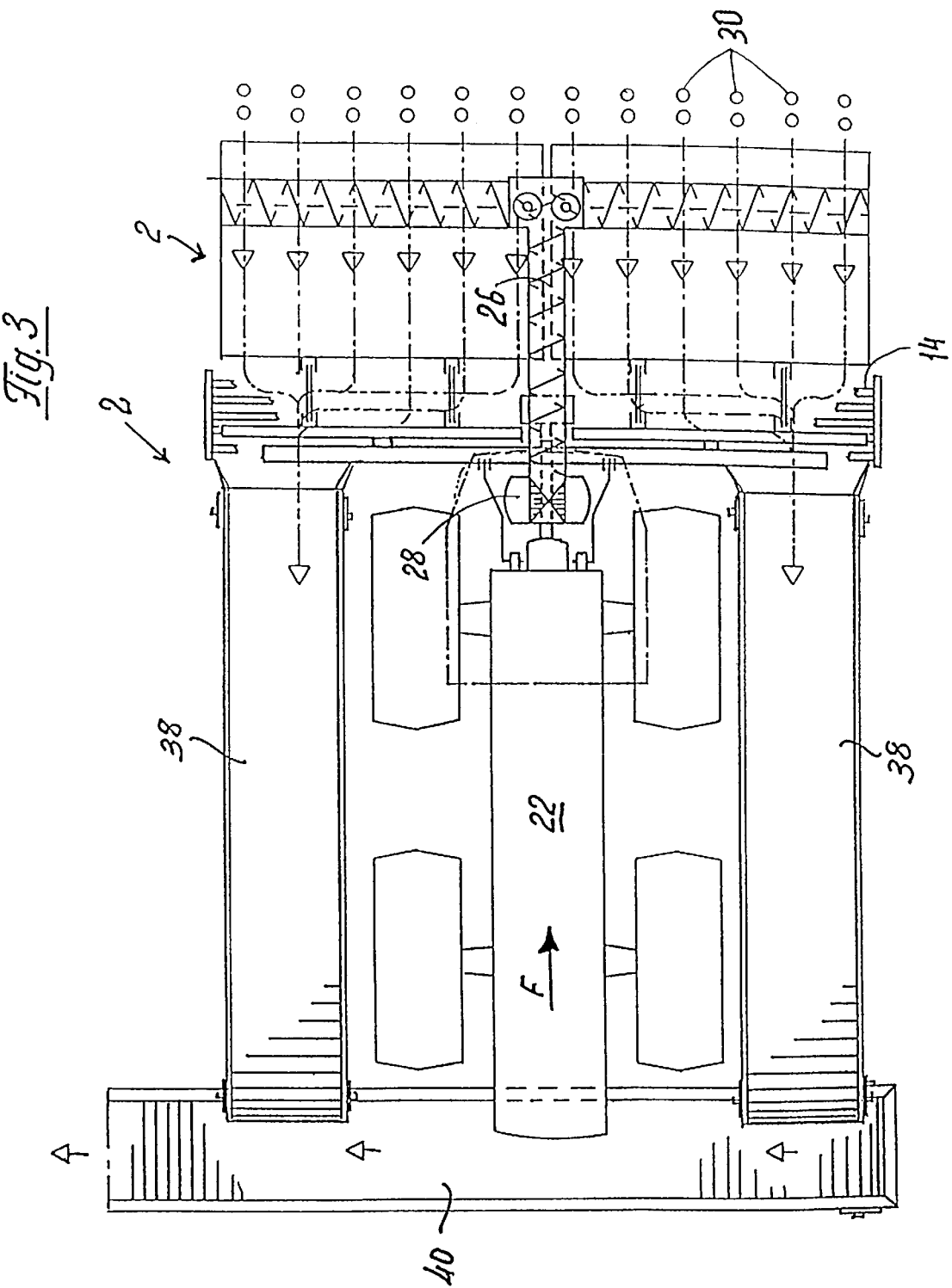

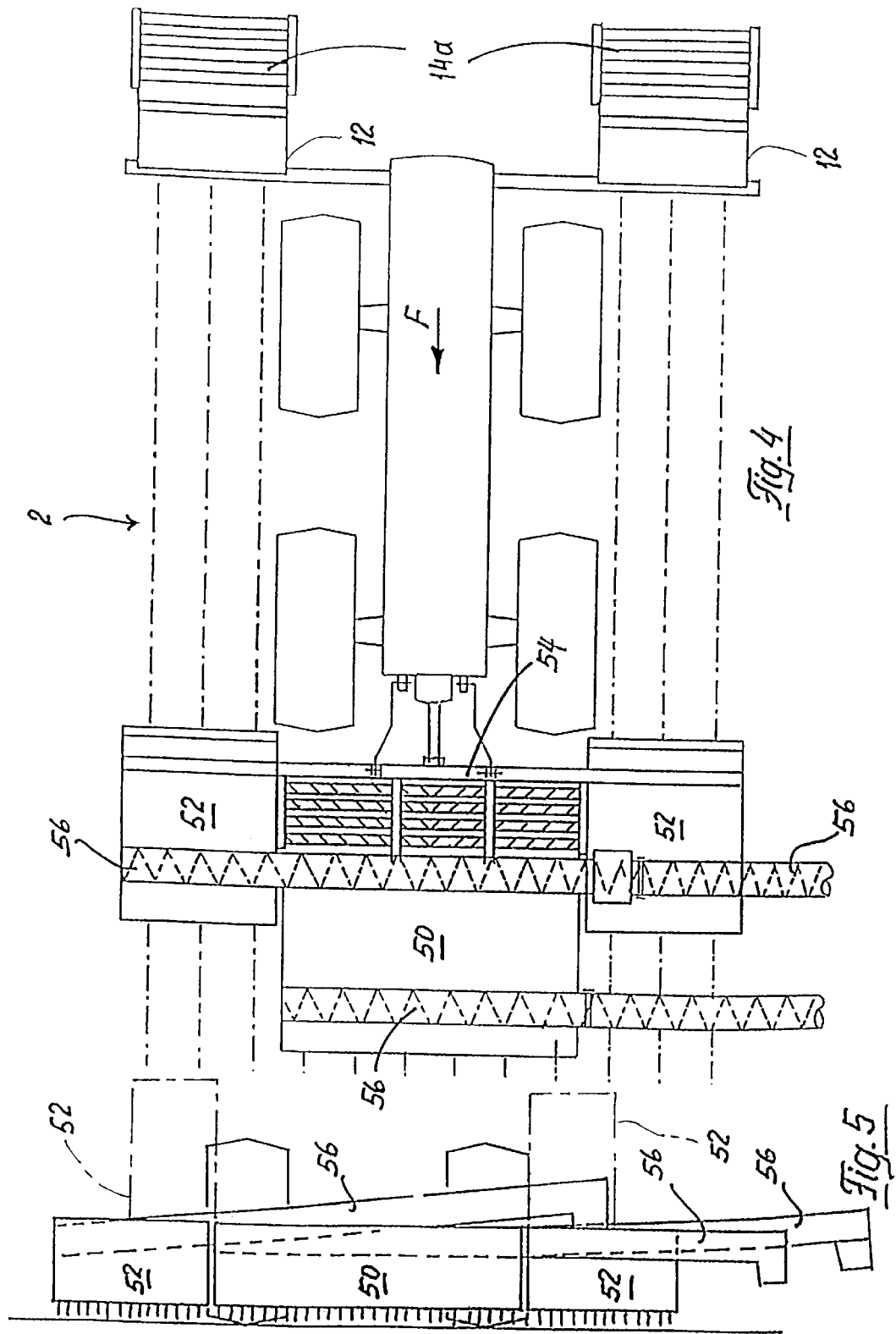

TOPPING AND DIGGING DEVICE FOR ROOT VEGETABLE HARVESTING MACHINES

BACKGROUND OF THE INVENTION

The present invention relates generally to agricultural machinery and, more particularly, to improvements to root vegetable harvesting machines. The term "root vegetable" is intended to include, inter alia, edible roots and tubers.

In root vegetable harvesting technology there is a distinction between single-stage and two-stage harvesting methods. In the single-stage harvesting method the root vegetables are topped, dug up, cleaned and, after possible intermediate binning, transferred to a transport vehicle. In the two-stage harvesting method only topping and digging, and sometimes also cleaning, are carried out in the first stage. The dug-up root vegetables are then deposited onto the field. Only in the second stage does a harvesting machine pick up the deposited root vegetables, possibly clean them further, and load them onto a transport vehicle.

The planting of root vegetables to be harvested in the fields is critical for the design of the root vegetable harvesting machines. For sowing the root vegetables, a technique is known which uses a working width of 3 m. In some countries this is the legal limit for roading the machines. Six rows of root vegetables are typically sown over the 3 m. width. In order to follow the course of the rows of root vegetables when harvesting, without suffering harvesting losses due to deviations from adjacent drill tracks, the root vegetable harvesting machines known today harvest 1, 2, 3 or 6 rows of the root vegetables. This ensures the capability of harvesting within a six-row drill track or planting path. So far as known, there is no technique for harvesting root vegetables in excess of six rows for either the single-stage or the two-stage harvesting method.

Apart from the difficulty of compensating for deviations of adjacent drill tracks, a further difficulty in harvesting more than six rows of root vegetables lies in the inability to reliably control the quantities of root vegetables and topped leaves produced. It is difficult to deposit a swathe between the wheels of the harvesting machine when harvesting more than six rows because the deposited leaves are pressed into the ground and can not be distributed sufficiently, and deposited root vegetables may be damaged by the wheels, causing unacceptable losses of crop material. Also, the space between the two front wheels is too narrow to convey the usual quantity of root vegetables produced from the topping and digging implement to the cleaning equipment in the single-stage method.

A further problem lies in guiding the topping and digging unit so that the leaves are reliably separated and each individual root vegetable is reliably unearthed when harvesting several rows continuously and close to the ground. In cases of uneven ground surfaces, the greater the number of rows which are harvested in a single operation, the greater the risk that individual rows will be poorly topped and/or unearthed.

It is an object of the present invention to provide a root vegetable harvesting machine which can harvest more than six rows of root vegetables.

Another object is to provide a root vegetable harvesting machine which overcomes one or more of the difficulties described above.

SUMMARY OF THE INVENTION

In accordance with the present invention there is provided a root vegetable harvesting machine having a root vegetable topping and digging unit at the front, frame means, means for mounting the frame means in suspension at the front of the machine, at least two root vegetable topping and digging elements, and means for movably mounting the topping and digging elements on the frame means for independent movement relative to each other. The root vegetable topping and digging unit's design enables harvesting more than six rows of root vegetables. Instead of an arrangement in a common main frame, the root vegetable topping and digging elements can also each be arranged in their own frame so as to be movable independently of each other directly on the root vegetable harvesting machine.

The arrangement of at least two root vegetable topping and digging elements mounted movably relative to each other allows for better adaptation of the implements to the ground during topping and digging. Furthermore, this arrangement of individual elements aids in the control of the quantities of material produced, as the material can be divided up and directed more easily than a large stream of material from a single root vegetable topping and digging element. Also, the individual root vegetable topping and digging element can be used on the modular principle both in a conventional manner, as a single element for harvesting up to six rows of root vegetables, or as a partial element in implements for harvesting more than six rows. This lowers the manufacturing costs and also simplifies maintenance and the supply of spare parts. If at least one of the root vegetable topping and digging elements is designed for harvesting six rows of root vegetables, the operator of the root vegetable harvesting machine can steer along a six-row drill track. In this case, only adaptation of the additional root vegetable topping and digging element or elements to the additional adjacent drill track would be necessary, thus reducing the expenditure on control and regulation.

BRIEF DESCRIPTION OF THE DRAWINGS

Reference is now made to the drawings which illustrate preferred embodiments of the invention and where the same numerals indicate the same parts throughout the several views.

FIG. 3 is a top view of the machine with a modification for use in the single-stage harvesting method;

FIG. 4 is a top view of the machine with a modified embodiment of the root vegetable topping and digging elements;

FIG. 5 is a front view of the FIG. 4 embodiment with a moved position shown in phantom lines.

DETAILED DESCRIPTION

Figure 1:
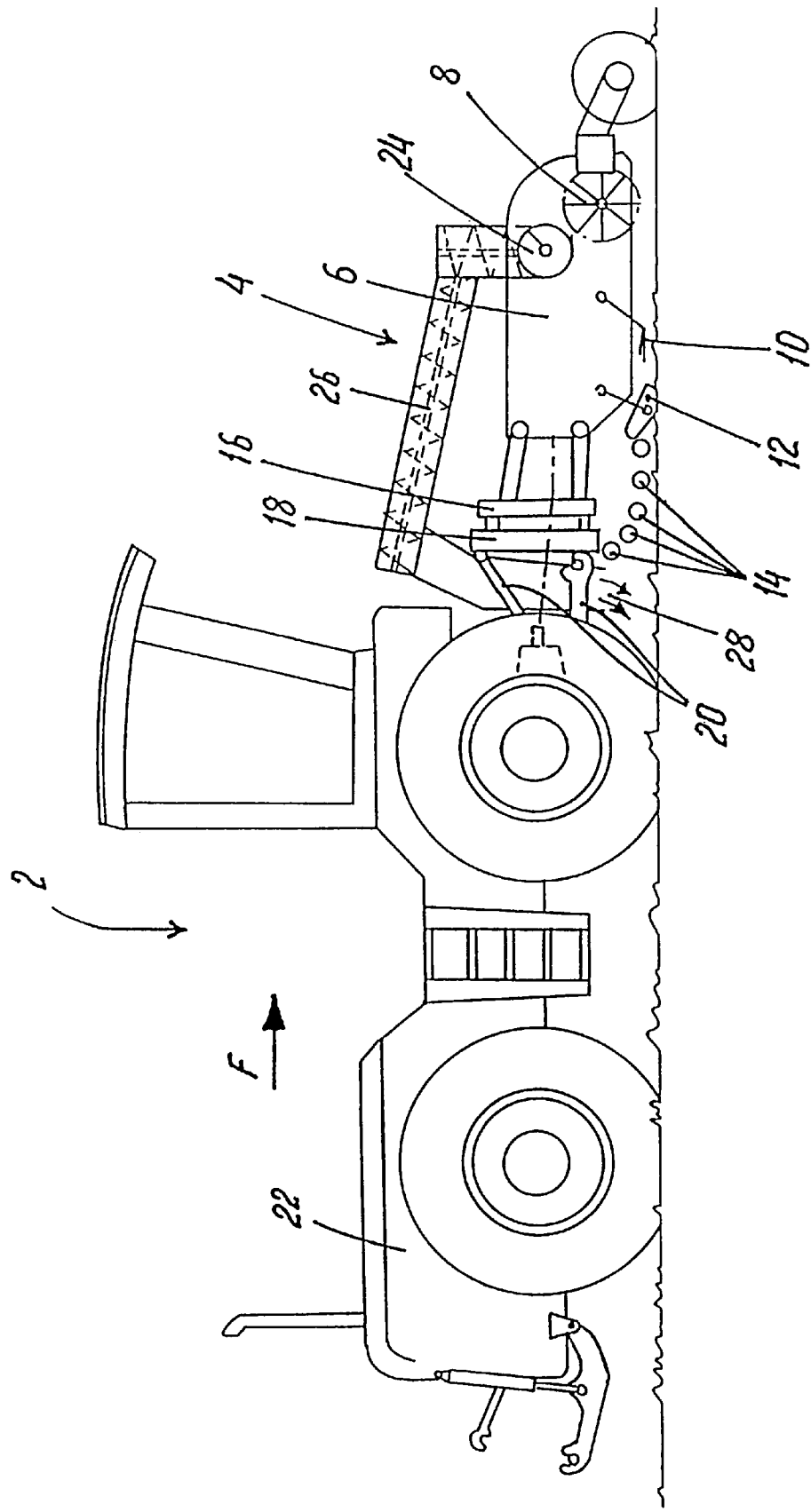
FIG. 1 is a side view of a machine with a root vegetable topping and digging unit attached at the front.

FIG. 1 shows a side view of a root vegetable harvesting machine 2. During the harvesting operation the root vegetable harvesting machine moves in the direction of travel F. The root vegetable topping and digging unit 4 comprises the actual root vegetable topping and digging device 6 with the individual cultivating tools. The beater 8 tops the root vegetable leaf, the topping blades 10 top the root vegetable and the digging shares 12 dig the root vegetables out of the ground. This is followed by cleaning by means of the spiral rollers 14. The digging unit 4 comprises an auxiliary frame 16 which is attached to the main frame 18. The main frame 18 is in turn connected by a linkage 20, for example a three-point suspension, to the frame of the root vegetable harvesting machine 2. In the practical example shown in FIG. 1, the root vegetable topping and digging unit 4 is moved by a machine 22. However, it is obvious to the expert that the proposed solution can also be used on a tractor or self-propelled root vegetable harvesting machine such as a topping/digging bin.

The root vegetables cleaned by the spiral rollers 14 can either be deposited on the field or passed on for subsequent cleaning, depending on whether they are harvested by the single-stage or two-stage harvesting method. In the practical example of FIGS. 1 and 2 the root vegetables are deposited on the field, as shown at 36. The cut-off leaf components of the root vegetable are conveyed by the leaf screw 24 to a leaf collector 26 which collects the leaf components from the whole root vegetable topping and digging unit 4, conveys them beyond it and deposits them through the outlet opening 28 on the field in the swathe, as shown at 29.

Figure 2:
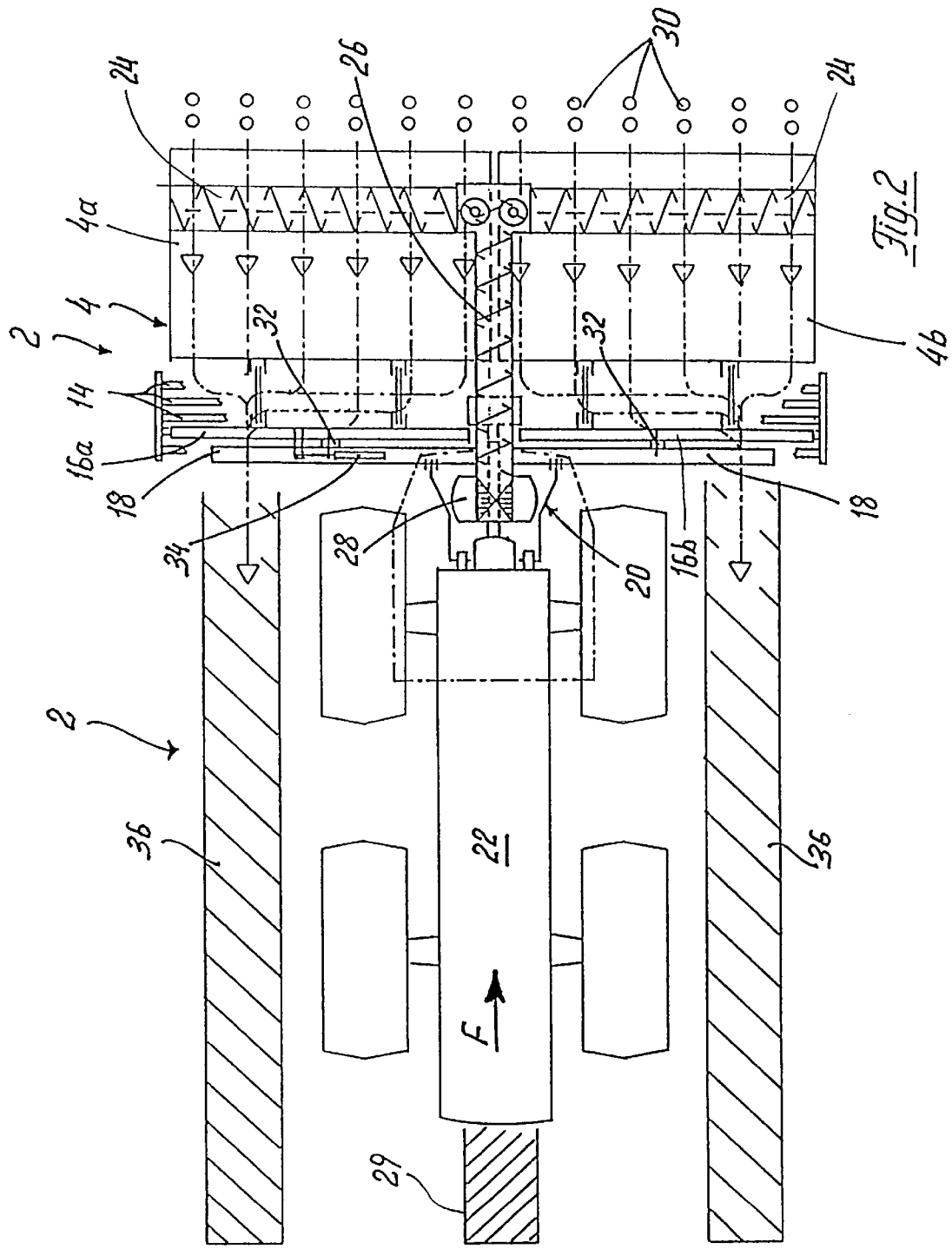
FIG. 2 is a top view of the root vegetable harvesting machine shown in FIG. 1.

FIG. 2 shows the root vegetable harvesting machine 2 shown in FIG. 1 in a view from above. The rows 30 of root vegetables are clearly visible. The root vegetable topping and digging unit 4 consists of two topping and digging elements 4a, 4b. The main frame 18 of the topping and digging unit 4 is connected to the machine 22 by the linkage 20. The auxiliary frames 16a, 16b, which are attached to the main frame 18, in turn carry the root vegetable topping and digging elements 4a, 4b. The coupling points 32 connect the main frame 18 to the auxiliary frames 16a, 16b in such a way that the auxiliary frames are rotatable about a horizontal axis extending essentially in the direction of travel. Rotation at the coupling points 32 allows the root vegetable topping and digging elements 4a, 4b to be adapted easily to the respective ground contour. The root vegetable topping and digging element 4a is mounted transversely upon a bearing rail by means of a hydraulic cylinder 34 and can slide along the bearing rail. With varying distances between the respective drill tracks, the root vegetable topping and digging elements 4a, 4b can be adapted to the distances found each time. Adjustment can take place manually or automatically by means of the signals of suitable sensors, such as feelers.

As can also be seen, the leaf collector 26 conveys the leaf components to the outlet opening 28, which lets the leaf components in the swathe drop onto the ground almost centrally to the longitudinal central axis of the machine 22. The swathe consisting of the leaf components thus forms centrally between the tires of the root vegetable harvesting machine 2. The cleaned vegetables are ejected by suitable spiral means of the spiral rollers 14 into two swathes 36 which are discharged at rear side openings of the root vegetable topping and digging unit 4. The finished swathes 36 lie laterally relative to the wheel track of the machine 22. With harvesting of the next row a double swathe is then formed, which in the two-stage harvesting method can easily be picked up in one operation by a subsequent cleaning loader.

In the practical example as FIGS. 1 and 2 the root vegetable topping and digging elements 4a, 4b are shown in a combination 6+6, so that the apparatus shown can top and dig up a total of 12 rows of root vegetables 30 in a single operation. It is however also conceivable, instead of the combination 6+6, to construct combinations of 3+3+3, 6+6+6, 3+3+3+3, 6+3, 6+3+3, 3+6+3, 6+6+3, 2+2+2+3 or other combinations. The combination should be selected such that easy adaptation to the ground conditions is possible. Furthermore, the combination should allow for an integral number of drill tracks to be harvested in at least two operations.

FIG. 3 shows a root vegetable harvesting machine whose topping and digging unit 4 essentially corresponds to the design shown in FIG. 2. The cleaned root vegetables are deposited by the spiral rollers 14 on two endless conveyors 38 arranged laterally relative to the cab. In a preferred embodiment the endless conveyors 38 are screen belts through which dirt can be removed from the root vegetables as they are transported down the conveyors 38. The endless belts 38 thus have a cleaning function. The endless conveyors 38 are shown adjacent to the wheels in the practical example, but it is also possible to arrange them above the wheels in order to remain within the permitted width limits, in spite of the dimensions of the machine. The endless belts 38 can, particularly with self-propelled topping and digging bins, be combined with subsequent or intermediate screen stars or other suitable cleaning elements to increase the cleaning action. The practical example of FIG. 3 shows a conveyor belt 40 located transversely to the direction of travel F, which is intended to transfer the root vegetables to a transport vehicle moving alongside, not shown in more detail. In this way the invention can also be used in root vegetable harvesting machines which operate with a single stage.

FIG. 4 shows an embodiment of the proposed invention which allows easier conversion of the root vegetable harvesting machine 2 for the widths permitted for road traffic. The combination of root vegetable topping and digging unit at the front consists of a combination of root vegetable topping and digging elements 50, 52 which harvest in 3+6+3 rows. A root vegetable topping and digging element 50, which in a traditional manner works in six rows, is centrally arranged. The root vegetables are deposited by spiral rollers 14 centrally between the wheels. Two root vegetable topping and digging elements 52, which work in three rows and which deposit the root vegetables on the field, are arranged laterally and adjacent to the root vegetable topping and digging element 50. However, the spiral rollers 14a associated with the root vegetable topping and digging elements 52 are arranged in a separate assembly, and are arranged laterally behind the root vegetable harvesting machine 2 so as to be pivotable by motorized servo means or manually from a horizontal position into an essentially vertical position. Because the root vegetable topping and digging elements 52 are also pivotable by motorized servo means 54 out of an essentially horizontal into an essentially vertical position, the roading width of the root vegetable harvesting machine 2 can be reduced quickly and easily. Instead of the spiral rollers 14a, another single cleaning means, such as screen stars, or combinations of cleaning means known in the art can be used. It is important that the spiral rollers 14a discharge the cleaned vegetables onto the swathe of vegetables located between the wheels of the root vegetable topping and digging device 2, shown in FIG. 4, so that a swathe of root vegetables may be harvested from rows 30 by digging shares 12, as previously described.

The leaf components separated by the root vegetable topping and digging elements 50, 52 are conveyed away, transversely beyond the root vegetable topping and digging elements 50, 52, by a conveying means 56 for lateral deposition to avoid mixing the cleaned vegetables with the leaf components. It is advantageous if the projecting ends of the conveying means 56 have different lengths in order to achieve better transverse distribution of the leaf components. FIG. 5 shows a schematic frontal view of the root vegetable harvesting machine 2 shown in FIG. 4. The way the conveying means 56 protrude laterally, at different lengths, beyond the root vegetable topping and digging elements 50, 52 to distribute the cut leaf components, is shown. The topping and digging elements 52 may be pivoted from a generally horizontal to a generally upright position shown in phantom lines in FIG. 5.

Figure 6:
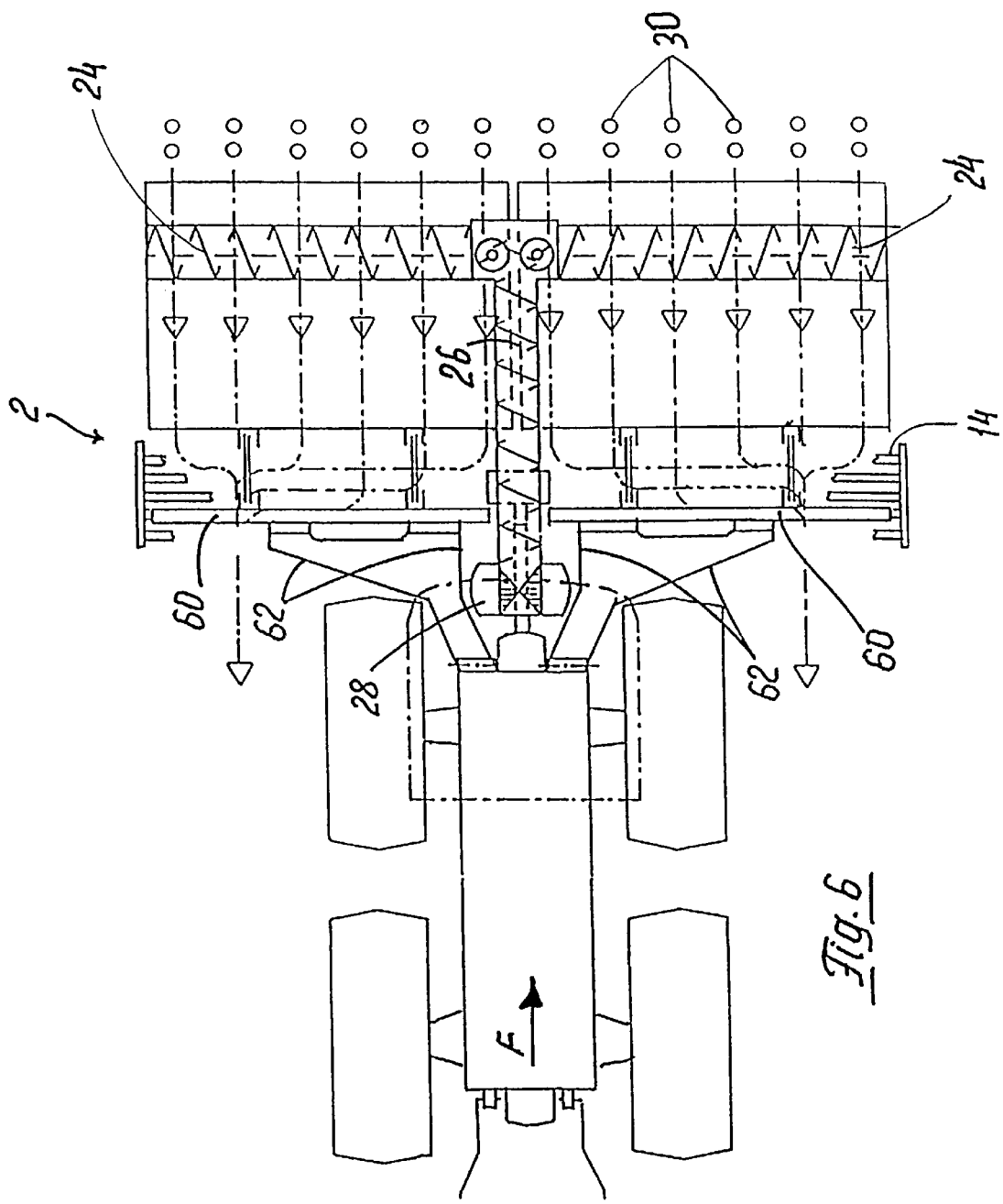
FIG. 6 is a top view of a root vegetable harvesting machine in which the root vegetable topping and digging elements each comprise their own frame.

FIG. 6 shows a practical example of how two root vegetable topping and digging elements 4a, 4b are arranged at the front so as to be movable independently of one another in their own frame 60. Each of the frames 60 is connected to the root vegetable harvesting machine 2 by a linkage 62, which can also consist of a separate three-point suspension.

Other objects, features and advantages will be apparent to those skilled in the art. While preferred embodiments of the present invention have been illustrated and described, this has been by way of illustration and the invention should not be limited except as required by the scope of the appended claims.

I claim:

1. A root vegetable harvesting machine having a front and having a root vegetable topping and digging unit at a front end, a frame, means for mounting the frame outwardly of the front end of the machine, at least two root vegetable topping and digging elements, and means for movably mounting the topping and digging elements on the frame for independent movement relative to each other, wherein at least one of said root vegetable topping and digging elements is movable transversely to the direction of travel during operation of the machine, whereby a topping and digging element may be adjusted in response to varying drill tracks of root vegetables.

2. A root vegetable harvesting machine according to claim 1, wherein the frame includes an auxiliary frame for each topping and digging element.

3. A root vegetable harvesting machine according to claim 2, wherein said auxiliary frames are releasably connected to the root vegetable harvesting machine.

4. A root vegetable harvesting machine according to claim 1, wherein said root vegetable topping and digging is constructed and arranged for harvesting more than six rows of root vegetables.

5. A root vegetable harvesting machine according to claim 1, wherein each topping and digging element has a discharge opening, whereby two laterally spaced swathes of dug-up root vegetables are deposited onto a field by the machine.

6. A root vegetable harvesting machine according to claim 5, wherein each discharge opening is at a side of the machine, and the laterally spaced swathes are deposited on opposite sides of the machine.

7. A root vegetable harvesting machine according to claim 1, wherein at least one of the topping and digging elements has a discharge opening located at a longitudinal axis of the machine, whereby a swathe of dug-up root vegetables is deposited onto a field along the longitudinal axis of the machine.

8. A root vegetable harvesting machine according to claim 7, including at least one cleaning device located away from the topping and digging elements and so constructed and arranged to deposit some of the dug-up root vegetables in the swathe only after the harvesting machine has passed a first part of the swathe.

9. A root vegetable harvesting machine according to claim 1, including a driver's cab, at least two endless conveyors passing laterally along the driver's cab; and wherein each topping and digging element has a discharge opening adjacent one of the endless conveyors, whereby said root vegetable topping and digging elements deposit unearthed root vegetables onto the endless conveyors.

10. A root vegetable harvesting machine having a front and having a root vegetable topping and digging unit at the front, a frame, means for mounting the frame in suspension outwardly of the front of the machine, at least two root vegetable topping and digging elements, and means for movably mounting the topping and digging elements on the frame for independent movement relative to each other, wherein the means for movably mounting said root vegetable topping and digging elements is arranged for pivotal movement about a generally horizontal axis extending in the direction of travel so that the topping and digging elements may be pivoted relative to each other.

11. A root vegetable harvesting machine according to claim 10, wherein the pivotably mounting of the root vegetable topping and digging element is so constructed and arranged that the topping and digging element may be pivoted slightly to keep it generally parallel to the ground surface and thereby accommodate lateral variations of the ground surface.

12. A root vegetable harvesting machine according to claim 10, wherein the pivotably mounting of the root vegetable topping and digging element is so constructed and arranged that the topping and digging element may be pivoted from a generally horizontal to a generally upright position.

13. A root vegetable harvesting machine having a root vegetable topping and digging unit at its front, a frame, means for mounting the frame at the front of the machine, at least two root vegetable topping and digging elements, and means for movably mounting the topping and digging elements on the frame for independent movement relative to each other, wherein at least one of said root vegetable topping and digging elements is mounted so as to be rotatable about its longitudinal axis in the direction of travel.

14. A root vegetable harvesting machine according to claim 13, including means for releasably connecting said frame to the root vegetable harvesting machine.

15. A root vegetable harvesting machine having a front end and having a root vegetable harvesting unit capable of harvesting more than six rows of root vegetables at the front end, a frame mounted at the front end of the machine and extending outwardly in the direction of travel of the machine, the root vegetable harvesting unit being located in the frame, the root vegetable harvesting unit including a plurality of harvesting elements, the harvesting elements extending outwardly in the direction of travel of the machine and extending transversely across the front end of the machine, and means for mounting the harvesting elements for independent movement relative to each other.

16. A root vegetable harvesting machine having a plurality of root vegetable harvesting elements, the root vegetable harvesting machine having the harvesting elements mounted in a root vegetable harvesting unit, the root vegetable harvesting machine having a front and having a first frame mounted at the front and extending outwardly of the front in the direction of travel of the root vegetable harvesting machine, the harvesting unit being mounted to the first frame, the first frame having a plurality of auxiliary frames mounted to the first frame, at least one of the auxiliary frames being releasably mounted to the first frame, the harvesting elements each being mounted to an auxiliary frame, the harvesting elements having longitudinal axes in the direction of travel of the root vegetable harvesting machine and the root vegetable harvesting machine including pivots permitting pivoting movement of the harvesting elements about the longitudinal axes to accommodate variations in a ground surface, at least one of the harvesting elements being movable transversely to the direction of travel of the root vegetable harvesting machine to permit adjustment to variations in the location of rows of root vegetables, at least one of the harvesting elements being pivotable to a substantially vertical position to reduce the width of the root vegetable harvesting machine for road travel, the root vegetable harvesting machine having a collector for collecting leaves of root vegetables harvested by the harvesting elements and depositing the collected leaves in a swathe.

17. A root vegetable harvesting machine according to claim 16 wherein the root vegetable harvesting machine has a conveyor for receiving root vegetables from a harvesting element.

* * * * *